(12) United States Patent
Kurutach et al.

(10) Patent No.: US 12,091,044 B2
(45) Date of Patent: Sep. 17, 2024

(54) HIERARCHICAL MODE ANCHORING

(71) Applicant: GM CRUISE HOLDINGS LLC, San Francisco, CA (US)

(72) Inventors: Thanard Kurutach, Bangkok (TH); Frank Jiang, San Francisco, CA (US); Mircea Grecu, San Mateo, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 380 days.

(21) Appl. No.: 17/557,838

(22) Filed: Dec. 21, 2021

(65) Prior Publication Data
US 2023/0192128 A1 Jun. 22, 2023

(51) Int. Cl.
B60W 60/00 (2020.01)
G06F 18/21 (2023.01)
G06F 18/214 (2023.01)

(52) U.S. Cl.
CPC ....... B60W 60/0011 (2020.02); G06F 18/214 (2023.01); B60W 2420/403 (2013.01); B60W 2554/4049 (2020.02)

(58) Field of Classification Search
CPC ....... B60W 60/0011; B60W 2420/403; B60W 2554/4049; G06F 18/214; G06V 10/7625; G06V 10/774; G06V 20/54
See application file for complete search history.

(56) References Cited

U.S. PATENT DOCUMENTS

| 10,579,063 | B2 * | 3/2020 | Haynes | G01S 13/931 |
| 11,458,991 | B2 * | 10/2022 | Lapin | B60W 50/06 |
| 11,462,041 | B2 * | 10/2022 | Bagwell | G06F 18/2321 |
| 11,537,134 | B1 * | 12/2022 | Wiest | G06N 3/0455 |
| 11,554,790 | B2 * | 1/2023 | Siebert | G05D 1/0217 |
| 11,745,762 | B2 * | 9/2023 | Ma | B60W 60/00274 |
| | | | | 701/23 |
| 11,789,155 | B2 * | 10/2023 | Bagwell | G06N 20/00 |
| | | | | 706/12 |
| 11,835,951 | B2 * | 12/2023 | Djuric | G05D 1/0088 |
| 11,880,293 | B1 * | 1/2024 | Hendrix | G06F 11/362 |
| 2022/0097732 | A1 * | 3/2022 | Cunningham | B60W 30/09 |
| 2023/0192128 | A1 * | 6/2023 | Kurutach | B60W 60/0011 |
| | | | | 701/23 |
| 2024/0101150 | A1 * | 3/2024 | Pronovost | B60W 60/00274 |

FOREIGN PATENT DOCUMENTS

WO WO-2021133582 A1 * 7/2021 ........... G01S 17/931

* cited by examiner

Primary Examiner — Yonel Beaulieu

(57) ABSTRACT

The subject disclosure relates to techniques for increasing a quality of predicted trajectories output from a trained prediction algorithm. A process of the disclosed technology can include receiving by a trained prediction algorithm, information about objects in an environment as perceived by sensors of an autonomous vehicle, receiving by the trained prediction algorithm, information about a location of the autonomous vehicle in the environment, generating by the trained prediction algorithm, a predicted trajectory for an object among the objects in the environment, wherein the predicted trajectory being anchored by a path through a tree of paths including at least two modes, wherein each mode creates a node in the tree, wherein a mode is a semantic classification of a portion of the predicted trajectory, and outputting by the trained prediction algorithm, the predicted trajectory for the object.

20 Claims, 5 Drawing Sheets

HIERARCHICAL MODE ANCHORING

BACKGROUND

1. Technical Field

The subject technology pertains to training a trajectory prediction model to improve the quality of predicted trajectories output therefrom and in particular, the subject technology pertains to anchoring path prediction with hierarchical modes to cause the path prediction model to output predicted trajectories having at least two modes.

2. Introduction

Trajectory prediction is important to help autonomous vehicles operate efficiently. Typically, prediction models will output one or more of the most likely outcomes or predictions. However, in some scenarios, an actual outcome may be too nuanced to be adequately predicted and output.

DETAILED DESCRIPTION

Figure 1:
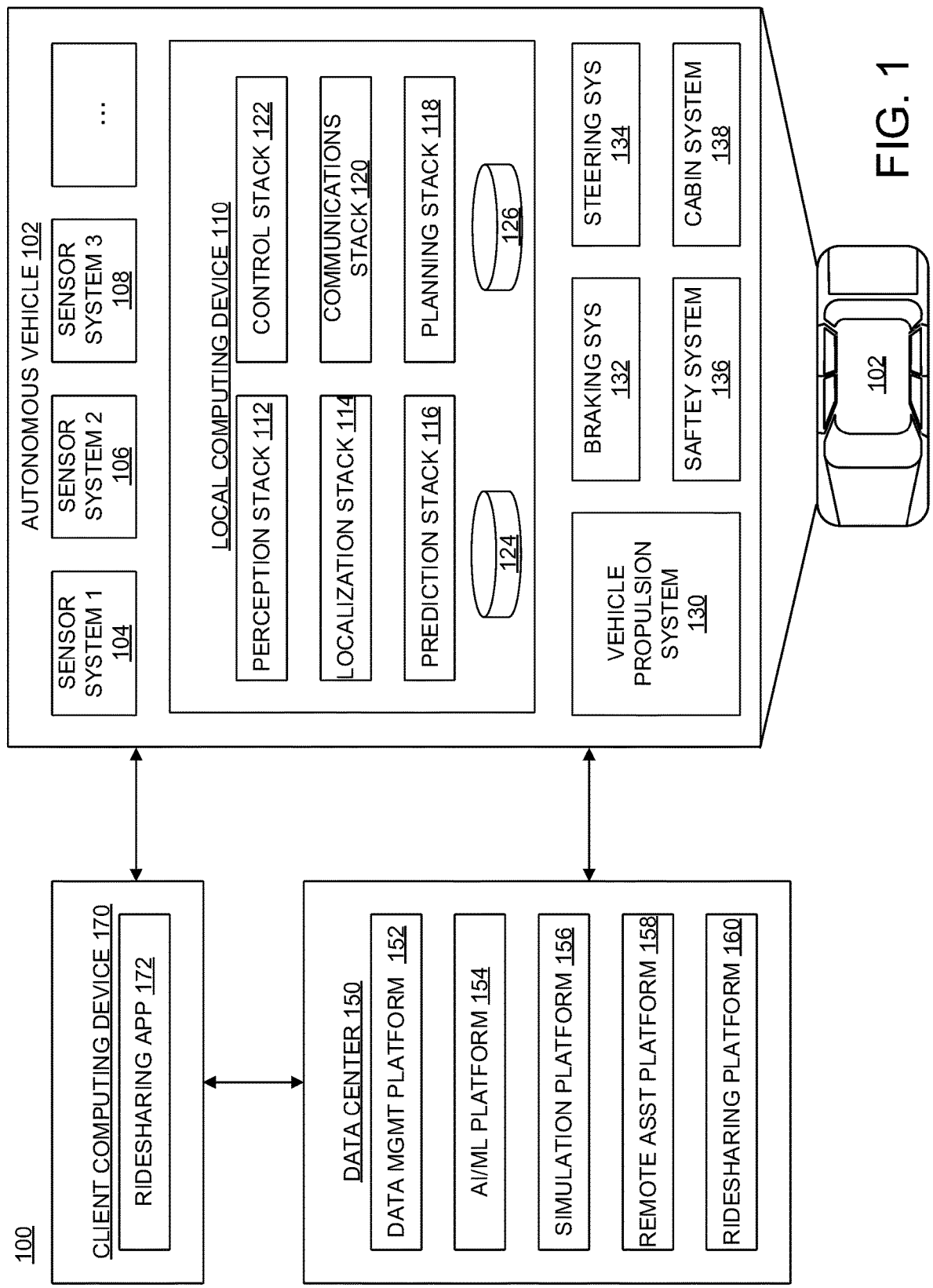
FIG. 1 illustrates an example of a system for managing one or more Autonomous Vehicles (AVs) in accordance with some aspects of the present technology.

Prediction is important to help autonomous vehicles (AV) operate efficiently. AVs need an idea of where other objects are and the likely paths that the objects might follow to operate efficiently and safely.

Typically, prediction models will output one or more of the most likely outcomes as a prediction. However, in some scenarios, the most likely outcomes might be too nuanced to be adequately predicted and output by traditional trajectory prediction models. In some examples, these outcomes may result in severe outcomes. For example, a prediction model might predict a right turn, but a more nuanced trajectory prediction might predict a right turn followed by a lane change to avoid a parked car. If the lane change would then interfere with the path of the AV, this could result in a severe outcome. Thus, there is a need in the art for improving trajectory predictions by including more nuanced trajectory predictions.

One benefit of utilizing modes to predict trajectories of objects is that each mode can be representative of multiple predicted trajectories. Modes can include left-lane changes, right-lane changes, left turns, right turns, staying stationary, and following the lane. For example, an object 202 may make a left lane change, but an exact position in each of the multiple predicted trajectories may be slightly different. Thus, AV 102 can collapse, merge, or otherwise combine these multiple predicted trajectories into a simplified mode representing the overarching concept of a left lane change. Additionally, it is to be understood that this usage of modes can be applied to each mode at each step of prediction. In other words, prediction stack 116 can provide nuanced trajectory predictions by utilizing a hierarchy of modes (e.g., a first mode for a first step, a second mode for a second step, etc.) while maintaining a simplified trajectory prediction for all potential trajectories utilizing the respective sequence of modes. In other words, AV 102 anchors portions of predicted trajectories into modes and hierarchically uses these modes to identify multiple predicted trajectories.

The present technology is a result of using modes in a hierarchical method. More specifically, simple modes may still miss some nuances of objects. For example, the trajectories in a semantic label or mode can diverge significantly from one another with different semantic and geometric properties. Thus, the mode or anchor alone is insufficient in capturing the distribution of potential predicted trajectories objects. Additionally, hand-designing semantic modes alone is not scalable and insufficient in capturing the distribution of actual trajectories.

Thus, the present technology also proposes hierarchical mode anchoring, which breaks down a long-horizon trajectory into multiple short-horizon (e.g., a segment-level) anchors, which enables the prediction of more nuanced maneuvers of objects. In other words, the predicted trajectories can be identified and recorded as multiple modes. For example, the predicted trajectories can be recorded as a cross product of modes and/or as a joint product of segment-level modes. Additionally, these modes or labels can be passed as one-hot vectors into a planning and/or prediction model for trajectory.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HID LIDAR point cloud data, image data, RADAR data, GPS data, and other sensor data that the data center 150 can use for creating or updating AV geospatial data or for creating simulations of situations encountered by AV 102 for future testing or training of various machine-learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine-learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
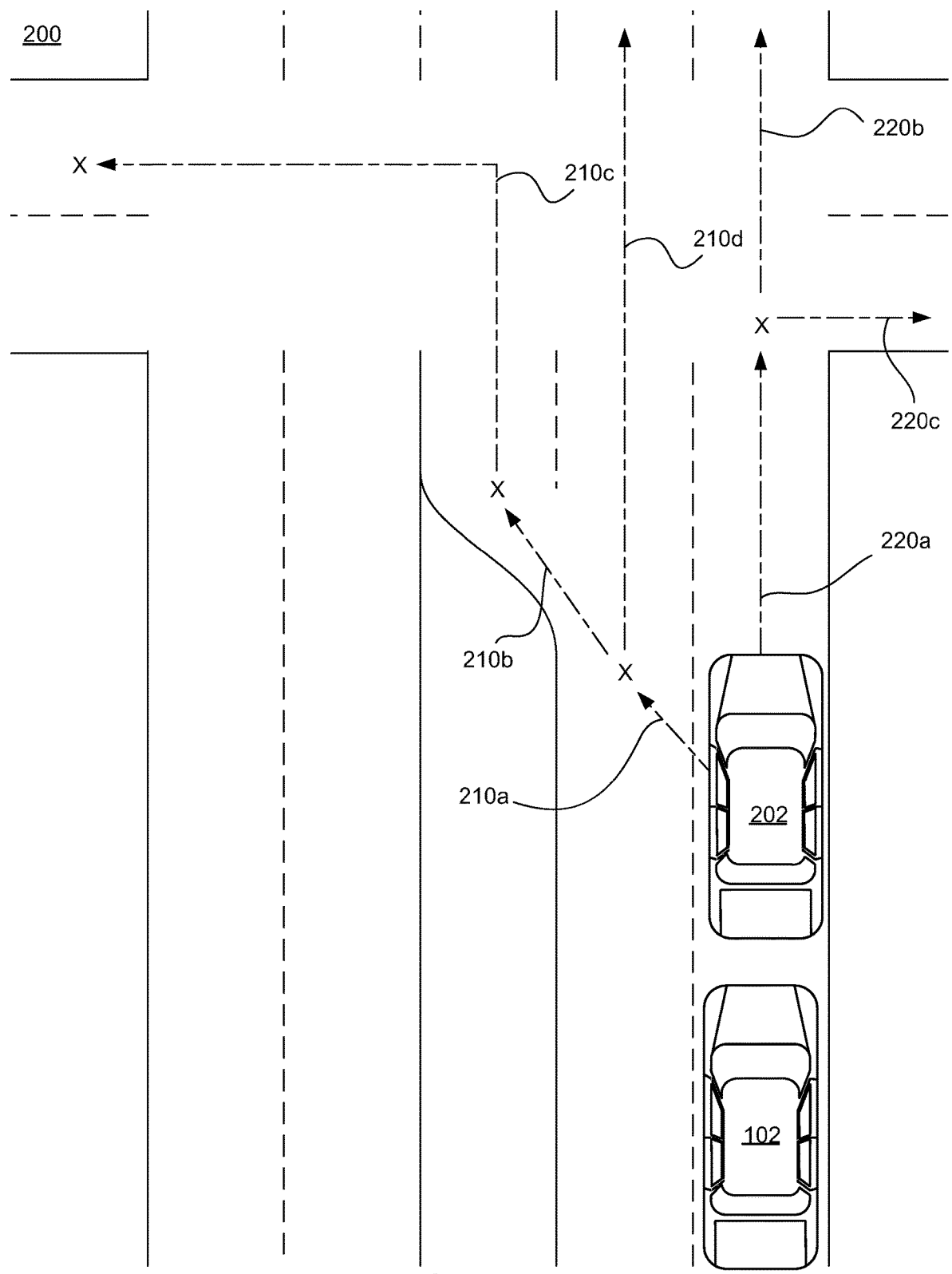
FIG. 2 illustrates an example environment having an autonomous vehicle and an object in accordance with some aspects of the present technology.

FIG. 2 illustrates an example environment 200 having AV 102 and an object 202. Object 202 may be another vehicle on the road. Object 202 can have multiple potential trajectories, many of which are of interest to AV 102, so that AV 102 can operate safely and efficiently. In other words, AV 102 needs to predict these potential trajectories of object 202 so that AV 102 can operate safely and efficiently in response to the potential trajectories.

AV 102 can observe and perceive object 202 via sensors (e.g., sensor systems 104-108) in communication with perception stack 112. The data recorded by the sensors can then be used by prediction stack 116. Prediction stack 116 can be configured to predict trajectories of object 202 based on the sensor data and any contextual information that may be captured by the sensor data. Additionally, the sensor data may include various modes of object 202. A mode can be a semantic classification for a portion of a trajectory. Example modes can include an object having a straight trajectory, a lane-follow trajectory, a left turn, a right turn, a left lane change, a right lane change, stopping, reversing, stationary, etc. In other words, a mode identifies a maneuver of object 202 in a given time frame. For example, object 202 may make a left turn in the next three seconds, so AV 102 can predict a mode identifying a left turn associated with a time frame of the next three seconds.

In some scenarios, AV 102 may detect object 202 driving straight and predict that object 202 will utilize multiple modes during a prediction horizon. A prediction horizon is a period from which AV 102 is making a prediction into a time in the future. For example, AV 102 may be interested in the next nine seconds and generated predicted trajectories that object 202 may follow during the next nine seconds. Thus AV 102 can detect object 202 making a signal to make a left lane change. In reality, object 202 may be making multiple left lane changes and then a left turn. In other words, object 202 can be predicted to have a left lane change mode 210a followed by another left lane change mode 210b followed by a left turn mode 210c. In other words, the predicted trajectory of object 202 includes multiple modes (e.g., multiple left lane change modes 210a, 210b, and a left turn mode 210c). AV 102 can predict a predicted trajectory for a nine-second prediction horizon having a first mode 210a to make a left lane change in the first three seconds, a second mode 210b to make another left lane change in the subsequent three seconds, and a third mode 210c to make a left turn in the final three seconds of the nine-second prediction horizon. Collectively, the multiple modes 210a, 210b, 210c formulate the predicted trajectory of the nine second prediction horizon. While traditional trajectory prediction models may predict some of the potential trajectories of object 202, these traditional trajectory prediction models may miss some trajectories that include more complex maneuvers and/or nuances as described. Additionally, it is to be understood that the durations discussed for the prediction horizons and modes are used solely for discussion purposes and that any durations can be used for prediction horizons and to divide the prediction horizons into modes of any durations.

It is also considered that the modes can be used individually for multiple predicted trajectories. For example, object 202 may make a left lane change 210a, but then continue going straight 210d instead of another left lane change 210b or left turn 210c. In other words, AV 102 can predict multiple predicted trajectories while using modes in hierarchically. In some embodiments, each mode can be representative of multiple predicted trajectories. For example, object 202 may make a left lane change but an exact position in each of the multiple predicted trajectories may be slightly different. Thus, AV 102 can collapse, merge, or otherwise combine these multiple predicted trajectories into a simplified mode that is representative of the overarching concept of a left lane change. Additionally, it is to be understood that this usage of modes can be applied to each mode at each step of prediction. In other words, prediction stack 116 can provide nuanced trajectory predictions by utilizing a hierarchy of modes (e.g., a first mode for a first step, a second mode for a second step, etc.) while maintaining a simplified trajectory prediction for all potential trajectories utilizing the respective sequence of modes. In other words, AV 102 anchors portions of predicted trajectories into modes and hierarchically uses these modes to identify multiple predicted trajectories.

As another example of a first mode being used for multiple predicted trajectories, AV 102 may predict object 202 driving straight and assign a straight mode 220a. AV 102 can also predict multiple other trajectories based on straight mode 220a as the first mode in the sequence. More specifically, AV 102 can predict that after going straight 220a, object 202 can be associated with an additional straight mode 220b and a right turn mode 220c and assign each mode 220b, 220c as a second mode in sequences of modes. Thus, AV 102 can output a predicted trajectory including a first sequence of modes as go straight 220a and continue straight 220b. Additionally, AV 102 can output another predicted trajectory, including a second sequence of modes as go straight 220a and then turn right 220c.

It is further considered that the multiple predicted trajectories can be visualized or processed as a tree of predicted trajectories. More specifically, each predicted trajectory can correspond to a leaf node in the tree of predicted trajectories. Moreover, the number of leaf nodes would be a total number of predicted trajectories. Additionally, each mode can be used to branch from a node. In other words, a current position of object 202 can be used as a root node and predictions of the first mode would generate branch nodes. For each branch node, predictions of the second mode would generate leaf nodes. Thus, the predictions of the first mode and the second node would encapsulate the predicted trajectory and be conceptualized from the root node to the branch node to the leaf node. For example, in a scenario where there are six possible modes at each node for object 202, there would be one root node (e.g., the current position of object 202), from which six different possible branch nodes stem. Six additional modes are possible from each of those six different branch nodes, which yields thirty-six different predicted trajectories. Additionally, six additional modes are still possible from each of those thirty-six different predicted trajectories, which yields 216 predicted trajectories identified as 216 different leaf nodes. In other words, the number of leaf nodes in the tree is based on a product of a number of possible modes at a first point in the tree multiplied by a number of possible modes at each further node in the tree.

It is also considered that the predicted trajectories can have respective probabilities associated therewith. The probabilities may identify a likelihood that the respective predicted trajectory will occur. Additionally, the probabilities can include a loss value or uncertainty that is indicative of a distance that object 202 taking the predicted trajectory may deviate from the predicted trajectory. In some embodiments, the predicted trajectory may include a plurality of points along the predicted trajectory. Thus, the loss values and/or uncertainty may be an uncertainty distribution that identifies and/or reflects distances that object 202 taking the predicted trajectory may deviate from respective points of the plurality of points.

Prediction stack 116 can then output the predicted trajectory or trajectories to planning stack 118, which can plan a path for AV 102 based on the predicted trajectories of object 202. In some embodiments, outputting the predicted trajectory includes outputting or passing the sequence of modes that form a respective predicted trajectory into planning stack 118. In some embodiments, the sequence of modes can be passed as a one-hot vector that distinguishes each sequence from every other sequence. In other words, each predicted trajectory node of the tree of paths would be different from every other node in the tree. Additionally, by passing the sequence of modes as one-hot vectors, each predicted path can be given equal weight or importance. In some embodiments, the sequence of modes can be passed with the probability of occurrence and weighted based on the probability of occurrence.

Figure 3:
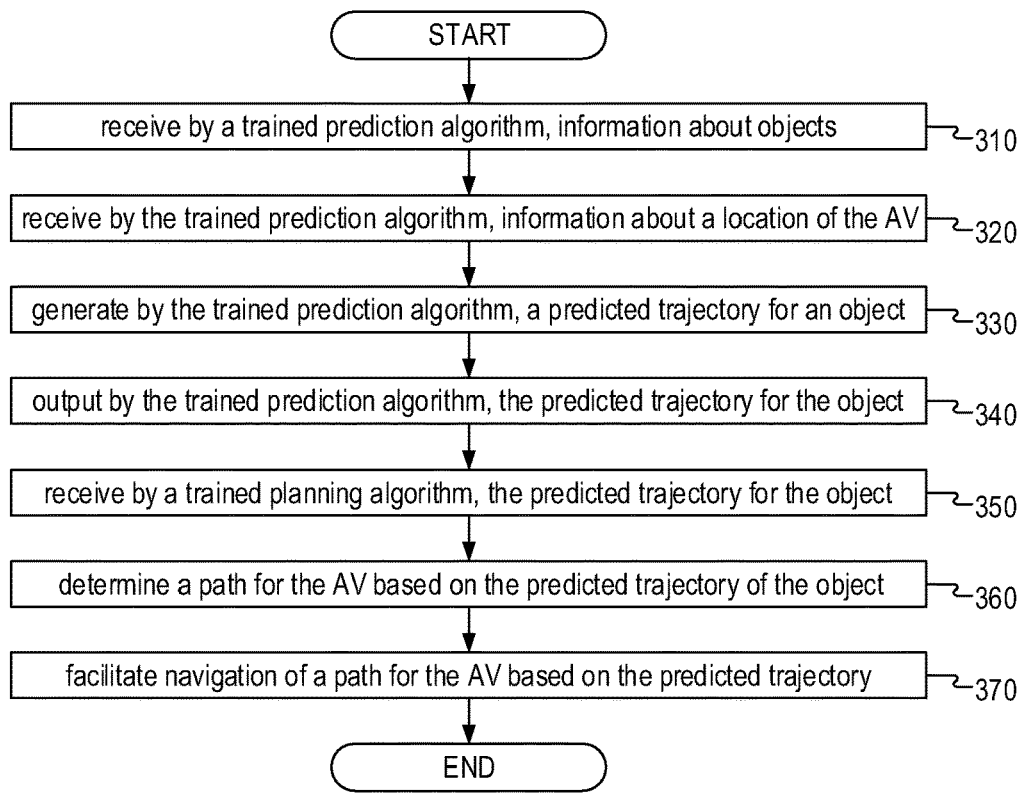
FIG. 3 is a flowchart of a method for increasing the quality of predicted trajectories output from a trained prediction algorithm in accordance with some aspects of the present technology.

FIG. 3 illustrates an example method 300 for increasing a quality of predicted trajectories output from a trained prediction algorithm. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

Method 300 includes receiving 310 by a trained prediction algorithm, information about objects in an environment as perceived by sensors of an autonomous vehicle. For example, prediction stack 116 illustrated in FIG. 1 may receive 310 by a trained prediction algorithm, information about objects in an environment as perceived by sensors of an autonomous vehicle.

Method 300 includes receiving 320 by the trained prediction algorithm, information about a location of the autonomous vehicle in the environment. For example, prediction stack 116 illustrated in FIG. 1 may receive 320 by the trained prediction algorithm, information about a location of the autonomous vehicle in the environment.

Method 300 includes generating 330 by the prediction algorithm, a predicted trajectory for an object among the objects in the environment. For example, prediction stack 116 illustrated in FIG. 1 may generate 330 by the prediction algorithm, a predicted trajectory for an object among the objects in the environment. In some embodiments, the predicted trajectory is anchored by a path through a tree of paths including at least two modes. In some embodiments, each mode creates a node in the tree. As discussed above, a mode is a semantic classification of a portion of the predicted trajectory. In some embodiments, each mode is one of a lane-follow trajectory, a left turn, a right turn, a left lane change, a right lane change, or a stationary trajectory. In some embodiments, the predicted trajectory for the object includes a probability of occurrence of the predicted trajectory. In some embodiments, the predicted trajectory includes and/or is identified by a plurality of points along the predicted trajectory. In some embodiments, the plurality of points are distributed at even time intervals, and each point is associated with an uncertainty distribution reflecting distances that the object taking the predicted trajectory may deviate from respective points.

Method 300 includes outputting 340 by the trained prediction algorithm, the predicted trajectory for the object. For example, prediction stack 116 illustrated in FIG. 1 may output 340 by the trained prediction algorithm, the predicted trajectory for the object. In some embodiments, there are six possible modes at each node in the tree, and each of the six possible modes can occur at three different times yielding 216 predicted trajectories. In some embodiments, a path corresponds to a sequence between a root node of the tree to a leaf node of the tree, the number of leaf nodes in the tree are based on a product of a number of possible modes at a first point in the tree multiplied by a number of possible modes at each further node in the tree. In some embodiments, the multiple predicted trajectories correspond to a number of leaf nodes in the tree of paths. In some embodiments, the outputting by the trained prediction algorithm the predicted trajectory for an object includes outputting multiple predicted trajectories, each predicted trajectory including a probability that a respective predicted trajectory will occur.

Method 300 includes receiving 350 by a trained planning algorithm, the predicted trajectory for the object. For example, the planning stack 118 illustrated in FIG. 1 may receive 350 by a trained planning algorithm, the predicted trajectory for the object.

Method 300 includes determining 360 a path for the autonomous vehicle based in part on the predicted trajectory of the object. For example, the planning stack 118 illustrated in FIG. 1 may determine a path for the autonomous vehicle based in part on the predicted trajectory of the object.

Method 300 includes facilitating 370 navigation of a path for the autonomous vehicle based at least in part on the predicted trajectory of the object. For example, the prediction stack 116, planning stack 118, and/or control stack 122 illustrated in FIG. 1 may facilitate 370 navigation of a path for the autonomous vehicle based at least in part on the predicted trajectory of the object.

Figure 4:
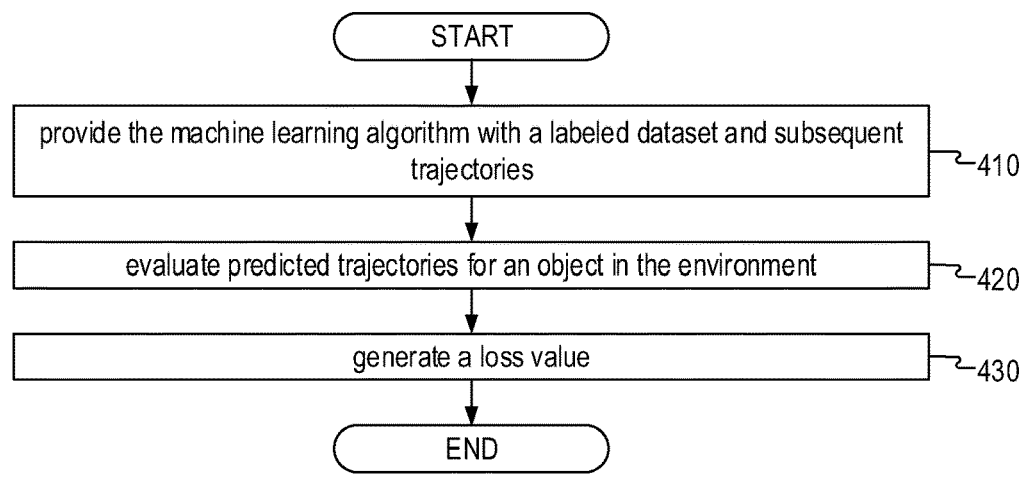
FIG. 4 is a flowchart of a method for training a machine-learning algorithm to analyze a greater diversity of trajectories for an object in order to increase the likelihood that an output trajectory prediction of a trained prediction algorithm will more closely represent an observed trajectory of the object in accordance with some aspects of the present technology.

FIG. 4 illustrates an example method 400 for training a machine-learning algorithm to analyze a greater diversity of trajectories for an object in order to increase the likelihood that an output trajectory prediction of a trained prediction algorithm will more closely represent an observed trajectory of the object. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

Method 400 includes providing 410 the machine-learning algorithm with a labeled dataset including information about objects in an environment as perceived by sensors of an autonomous vehicle and the subsequent trajectories observed to be traveled by the objects in the environment. For example, AI/ML platform 154 illustrated in FIG. 1 may provide 410 the machine-learning algorithm with a labeled dataset including information about objects in an environment as perceived by sensors of an autonomous vehicle and the subsequent trajectories observed to be traveled by the objects in the environment. In some embodiments, the subsequent trajectories are labeled to identify at least two modes represented in the respective trajectories. As discussed above, a mode is a semantic classification of a portion of the predicted trajectory. In some embodiments, the labeled dataset may also include predicted modes and respective probabilities of occurrence of the modes. In some embodiments, the labeled dataset may also include predicted trajectories and respective probabilities of occurrence of the predicted trajectories.

Method 400 includes evaluating 420 predicted trajectories for an object from the objects in the environment. For example, AI/ML platform 154 illustrated in FIG. 1 may evaluate 420 predicted trajectories for an object from the objects in the environment. In some embodiments, the predicted trajectories are determined by the machine-learning algorithm, and the predicted trajectories are evaluated to determine how closely a sequence of the at least two modes represented in the respective predicted trajectories match the labeled modes in the subsequent trajectories observed to be traveled by the object.

Method 400 includes generating and/or providing 430 a loss value. In some embodiments, the loss value provides feedback to encourage or discourage the sequence of the at least two modes represented in the respective predicted trajectories. For example, AI/ML platform 154 illustrated in FIG. 1 may generate and/or provide 430 a loss value that provides feedback to encourage or discourage the sequence of the at least two modes represented in the respective predicted trajectories. In some embodiments, the sequence of the at least two modes that more closely matches the at least two modes represented in the respective predicted trajectories is encouraged.

In some embodiments, the loss value provides feedback to encourage or discourage a respective trajectory. For example, AI/ML platform 154 illustrated in FIG. 1 may generate 430 a loss value that provides feedback to encourage or discourage a respective trajectory. In some embodiments, the respective trajectory that more closely matches the subsequent trajectory observed to be traveled is encouraged.

In some embodiments, the loss value provides feedback to encourage or discourage a respective trajectory with at least two modes. For example, AI/ML platform 154 illustrated in FIG. 1 may generate and/or provide 430 a loss value that provides feedback to encourage or discourage a respective trajectory having the at least two modes. In some embodiments, the trajectory that more closely matches the subsequent trajectory observed and more correctly identifies the at least two modes is encouraged.

Figure 5:
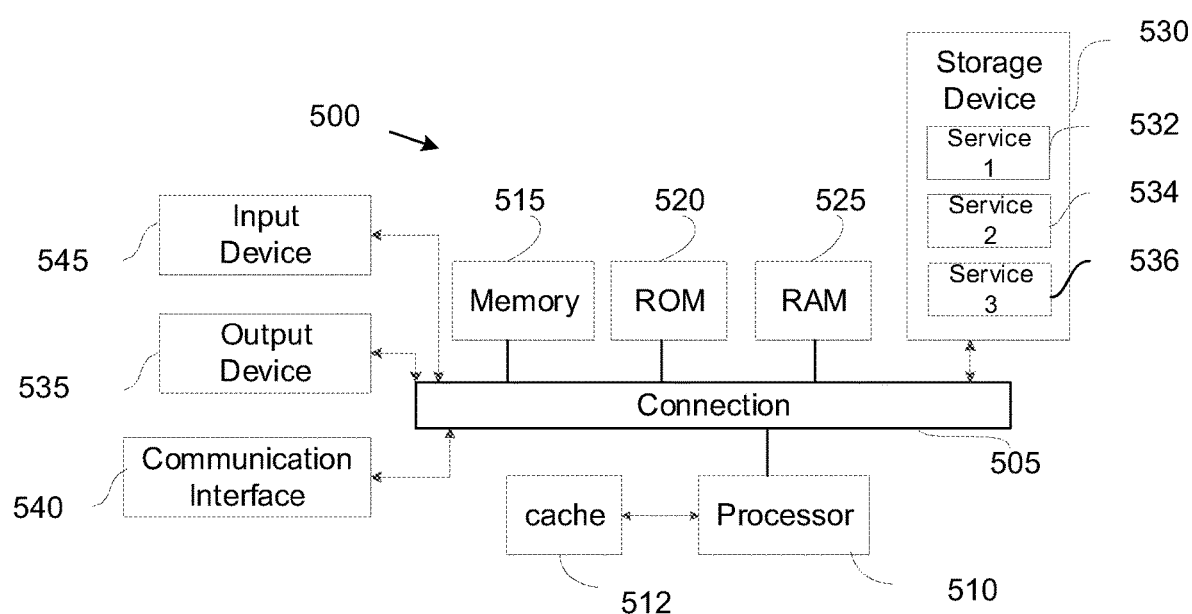
FIG. 5 shows an example of a system for implementing certain aspects of the present technology.

The loss value can then be used to train the machine-learning algorithm to analyze a greater diversity of trajectories for an object in order to increase the likelihood that an output trajectory prediction of a trained prediction algorithm will more closely represent an observed trajectory of the object FIG. 5 shows an example of computing system 500, which can be, for example any computing device making up autonomous vehicle 102, local computing device 110, data center 150, client computing device 170, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method for increasing a quality of predicted trajectories output from a trained prediction algorithm, the method comprising:
   receiving by a trained prediction algorithm, information about objects in an environment as perceived by sensors of an autonomous vehicle;
   receiving by the trained prediction algorithm, information about a location of the autonomous vehicle in the environment;
   generating by the trained prediction algorithm, a predicted trajectory for an object among the objects in the environment, wherein the predicted trajectory being anchored by a path through a tree of paths including at least two modes, wherein each mode creates a node in the tree, wherein a mode is a semantic classification of a portion of the predicted trajectory;
   outputting by the trained prediction algorithm, the predicted trajectory for the object; and
   facilitating navigation of a path for the autonomous vehicle based at least in part on the predicted trajectory of the object.

2. The method of claim 1, wherein each mode is one of a lane-follow trajectory, a left turn, a right turn, a left lane change, a right lane change, or stationary trajectory.

3. The method of claim 1, wherein the predicted trajectory for the object includes a probability of occurrence of the predicted trajectory.

4. The method of claim 1, wherein the predicted trajectory includes a plurality of points along the predicted trajectory, wherein the plurality of points are distributed at even time intervals, and each point is associated with an uncertainty distribution reflecting distances that the object taking the predicted trajectory may deviate from respective points.

5. The method of claim 1, wherein the outputting by the trained prediction algorithm the predicted trajectory for an object includes outputting multiple predicted trajectories, each predicted trajectory including a probability that a respective predicted trajectory will occur.

6. The method of claim 1, wherein the predicted trajectory is one of multiple predicted trajectories, the multiple predicted trajectories correspond to a number of leaf nodes in the tree of paths, wherein a path corresponds to a sequence between a root node of the tree to a leaf node of the tree, the number of leaf nodes in the tree are based on a product of a number of possible modes at a first point in the tree multiplied by a number of possible modes at each further node in the tree.

7. The method of claim 6, wherein there are six possible modes at each node in the tree, and each of the six possible modes can occur at three different times yielding 216 predicted trajectories.

8. The method of claim 1, further comprising:
   receiving by a trained planning algorithm, the predicted trajectory for the object; and
   determining the path for the autonomous vehicle based in part on the predicted trajectory of the object.

9. A system comprising:
   a storage configured to store instructions;
   a processor configured to execute the instructions and cause the processor to:

receive by a trained prediction algorithm, information about objects in an environment as perceived by sensors of an autonomous vehicle, receive by the trained prediction algorithm, information about a location of the autonomous vehicle in the environment, generate by the trained prediction algorithm, a predicted trajectory for an object among the objects in the environment, wherein, the predicted trajectory being anchored by a path through a tree of paths including at least two modes, each mode creates a node in the tree, and a mode is a semantic classification of a portion of the predicted trajectory, output by the trained prediction algorithm, the predicted trajectory for the object, and facilitate navigation of a path for the autonomous vehicle based at least in part on the predicted trajectory of the object.

10. The system of claim 9, wherein each mode is one of a straight trajectory, a left turn, a right turn, a left lane change, a right lane change, or unclassified trajectory.

11. The system of claim 9, wherein the predicted trajectory for the object includes a probability of occurrence of the predicted trajectory.

12. The system of claim 9, wherein the predicted trajectory includes a plurality of points along the predicted trajectory and the predicted trajectory includes a plurality of points along the predicted trajectory.

13. The system of claim 9, wherein the outputting by the trained prediction algorithm the predicted trajectory for an object includes outputting multiple predicted trajectories, each predicted trajectory including a probability that a respective predicted trajectory will occur.

14. The system of claim 9, wherein the predicted trajectory is one of multiple predicted trajectories, the multiple predicted trajectories correspond to a number of leaf nodes in the tree of paths and the multiple predicted trajectories correspond to a number of leaf nodes in the tree of paths.

15. The system of claim 9, wherein the processor is configured to execute the instructions and cause the processor to:

receive by a trained planning algorithm, the predicted trajectory for the object; and determine the path for the autonomous vehicle based in part on the predicted trajectory of the object.

16. A non-transitory computer-readable medium comprising instructions for execution which, when executed by a processor, result in operations comprising:

receiving by a trained prediction algorithm, information about objects in an environment as perceived by sensors of an autonomous vehicle;

receiving by the trained prediction algorithm, information about a location of the autonomous vehicle in the environment;

generating by the trained prediction algorithm, a predicted trajectory for an object among the objects in the environment, wherein the predicted trajectory being anchored by a path through a tree of paths including at least two modes, wherein each mode creates a node in the tree, wherein a mode is a semantic classification of a portion of the predicted trajectory; and facilitating navigation of a path for the autonomous vehicle based at least in part on the predicted trajectory of the object.

17. The non-transitory computer-readable medium of claim 16, wherein each mode is one of a lane-follow trajectory, a left turn, a right turn, a left lane change, a right lane change, or stationary trajectory.

18. The non-transitory computer-readable medium of claim 16, wherein the predicted trajectory for the object includes a probability of occurrence of the predicted trajectory.

19. The non-transitory computer-readable medium of claim 16, wherein the predicted trajectory includes a plurality of points along the predicted trajectory, wherein the plurality of points are distributed at even time intervals, and each point is associated with an uncertainty distribution reflecting distances that the object taking the predicted trajectory may deviate from respective points.

20. The non-transitory computer-readable medium of claim 16, wherein the outputting by the trained prediction algorithm the predicted trajectory for an object includes outputting multiple predicted trajectories, each predicted trajectory including a probability that a respective predicted trajectory will occur.

\* \* \* \* \*